US009575892B2

(12) United States Patent
Deming et al.

(10) Patent No.: US 9,575,892 B2
(45) Date of Patent: Feb. 21, 2017

(54) REPLAYING MEMORY TRANSACTIONS WHILE RESOLVING MEMORY ACCESS FAULTS

(71) Applicant: NVIDIA CORPORATION, Santa Clara, CA (US)

(72) Inventors: James Leroy Deming, Madison, AL (US); Jerome F. Duluk, Jr., Palo Alto, CA (US); John Mashey, Portola Valley, CA (US); Mark Hairgrove, San Jose, CA (US); Lucien Dunning, Santa Clara, CA (US); Jonathon Stuart Ramsey Evans, Santa Clara, CA (US); Samuel H. Duncan, Arlington, MA (US); Cameron Buschardt, Round Rock, TX (US); Brian Fahs, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 157 days.

(21) Appl. No.: 14/109,678

(22) Filed: Dec. 17, 2013

(65) Prior Publication Data
US 2014/0281263 A1    Sep. 18, 2014

Related U.S. Application Data

(60) Provisional application No. 61/800,004, filed on Mar. 15, 2013, provisional application No. 61/793,998, filed on Mar. 15, 2013.

(51) Int. Cl.
*G06F 12/08* (2016.01)
*G06F 9/46* (2006.01)

(52) U.S. Cl.
CPC .............. *G06F 12/08* (2013.01); *G06F 9/467* (2013.01); *G06F 2212/301* (2013.01)

(58) Field of Classification Search
CPC ..... G06F 12/08; G06F 9/467; G06F 2212/301
See application file for complete search history.

(56) References Cited

U.S. PATENT DOCUMENTS

| 5,764,944 | A  | * | 6/1998 | Hwang et al. | 711/207 |
| 8,266,383 | B1 | * | 9/2012 | Minkin et al. | 711/125 |
| 8,365,015 | B1 | * | 1/2013 | Yu et al. | 714/16 |
| 2009/0198893 | A1 | * | 8/2009 | Sorgard et al. | 711/118 |

* cited by examiner

*Primary Examiner* — Aracelis Ruiz
(74) *Attorney, Agent, or Firm* — Artegis Law Group, LLP

(57) ABSTRACT

One embodiment of the present invention is a parallel processing unit (PPU) that includes one or more streaming multiprocessors (SMs) and implements a replay unit per SM. Upon detecting a page fault associated with a memory transaction issued by a particular SM, the corresponding replay unit causes the SM, but not any unaffected SMs, to cease issuing new memory transactions. The replay unit then stores the faulting memory transaction and any faulting in-flight memory transaction in a replay buffer. As page faults are resolved, the replay unit replays the memory transactions in the replay buffer—removing successful memory transactions from the replay buffer—until all of the stored memory transactions have successfully executed. Advantageously, the overall performance of the PPU is improved compared to conventional PPUs that, upon detecting a page fault, stop performing memory transactions across all SMs included in the PPU until the fault is resolved.

20 Claims, 5 Drawing Sheets

REPLAYING MEMORY TRANSACTIONS WHILE RESOLVING MEMORY ACCESS FAULTS

CROSS-REFERENCE TO RELATED APPLICATIONS

This application claims benefit of the U.S. Provisional Patent Application having Ser. No. 61/800,004, filed on Mar. 15, 2013, which is hereby incorporated herein by reference. This application claims also benefit of the U.S. Provisional Patent Application having Ser. No. 61/793,998, filed on Mar. 15, 2013, which is hereby incorporated herein by reference.

BACKGROUND OF THE INVENTION

Field of the Invention

The present invention generally relates to computer science and, more specifically, to replaying memory transactions while resolving memory access faults.

Description of the Related Art

A typical computer system includes a central processing unit (CPU) and a parallel processing unit (PPU). As software applications execute on the computer system, the CPU and the PPU perform memory operations to store and retrieve data in physical memory locations. Some advanced computer systems implement a unified virtual memory architecture (UVM) common to both the CPU and the PPU. Among other things, the architecture enables the CPU and the PPU to access a physical memory location using a common (e.g., the same) virtual memory address, regardless of whether the physical memory location is within system memory or memory local to the PPU (PPU memory).

Computer systems typically include memory management functions to facilitate virtual memory and paging operations. During the course of normal operation, an instruction may request access to a virtual address associated with a page of data that is paged out, resulting in an access fault. In response to the access fault, conventional processing units may complete instructions preceding the faulting instruction, and cancel the faulting instruction along with all instructions that began execution subsequent to the faulting instruction. At this point, an access fault handler pages-in the requested page of data and re-starts execution beginning with the faulting instruction. In some cases, the access fault handler may require a significant amount of time to complete relative to typical instruction execution time. In particular, if the computer system implements a unified virtual memory architecture, then the access fault handler may perform lengthy faulting procedures that migrate memory pages between system and memory local to the PPU.

In a highly-parallel, multithreaded, advanced PPU, hundreds or many thousands of memory transactions, and therefore many address translations, may be outstanding at any moment. Consequently, numerous memory access faults may be active at any moment. If a PPU were to implement a conventional instruction-cancellation fault handing technique, then the PPU would frequently cancel thousands of instructions over all execution units. Further, the PPU would wait for lengthy access fault handling procedures to load paged out data for each faulting instruction within each executing thread. Such latencies would significantly, and often unacceptably, degrade overall system performance.

As the foregoing illustrates, what is needed in the art is a more effective approach to handling access faults involving a multithreaded processing unit.

SUMMARY OF THE INVENTION

One embodiment of the present invention sets for a computer-implemented method for processing virtual memory transactions associated with a multithreaded processing unit. The method includes receiving a first virtual memory transaction from a first unit; attempting to execute the first virtual memory transaction; detecting a first page fault related to the first virtual memory transaction; storing the first virtual memory transaction in a replay buffer; causing a stall condition that inhibits the first unit from generating subsequent virtual memory transactions until the first page fault has been resolved; and once the first page fault has been resolved, re-executing the first virtual memory transaction as well as at least one other virtual memory transaction stored in the replay buffer.

One advantage of the disclosed approach is that units included in a multithreaded processing unit that did not contribute to a page fault continue issuing virtual memory transactions in the presence of the page fault. Further, since an affected unit continues to replay the faulting virtual memory transaction as well as faulting in-flight virtual memory transactions, these virtual memory transactions are not cancelled while page faults are resolved. Consequently, the overall performance of the multithreaded processing unit is improved compared to conventional multithreaded processing units that, upon generating a page fault, cancel virtual memory transactions issued by all units within the multiprocessing unit until the page fault is resolved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
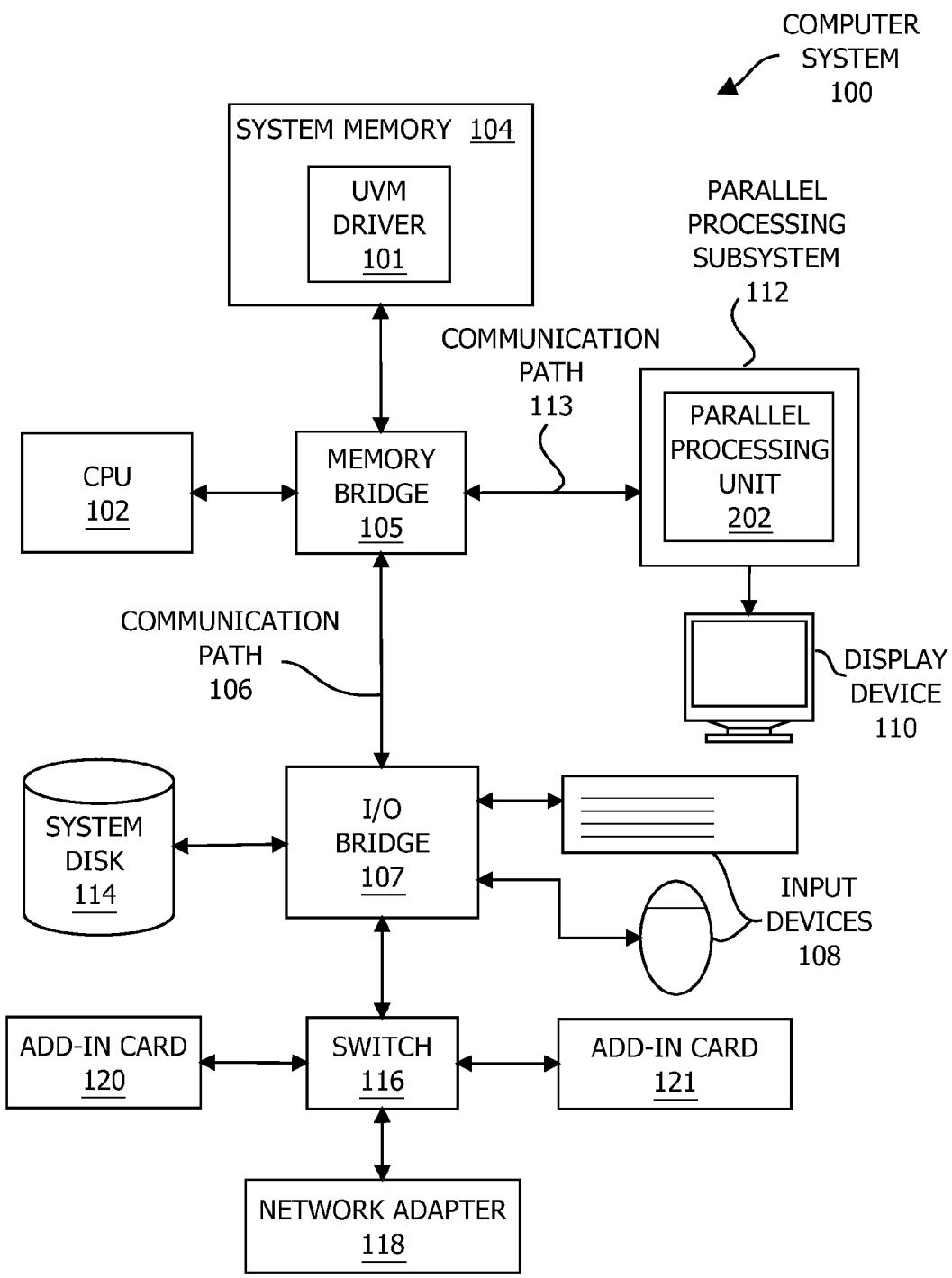
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202.

Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
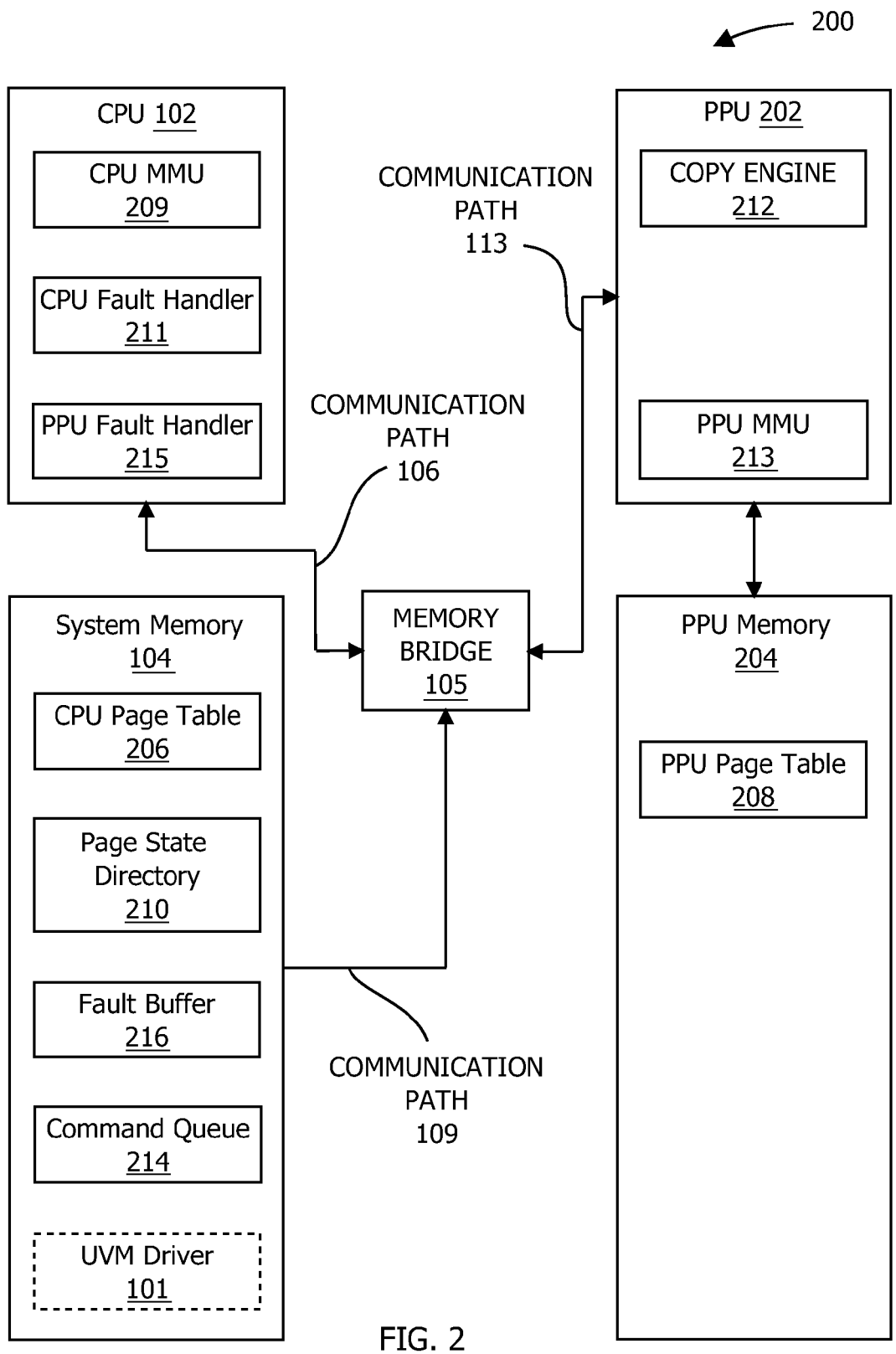
FIG. 2 is a block diagram illustrating a unified virtual memory system (UVM), according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the CPU 102 and the PPU 202 can access the memory page via a virtual address without causing a page fault. A CPU-shared page may reside in either the system memory 104 or the PPU memory 204.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:
- (a) on the CPU 102 access to an unmapped page that is mapped to the PPU 202, that has not been recently migrated, unmap the faulting page from the PPU 202, migrate the page to the CPU 102, and map the page to the CPU 102;
- (b) on the PPU 202 access to an unmapped page that is mapped to the CPU 102, that has not been recently migrated, unmap the faulting page from the CPU 102, migrate the page to the PPU 202, and map the page to the PPU 202;
- (c) on the CPU 102 access to an unmapped page that is mapped to the PPU 202, that has been recently migrated, migrate the faulting page to the CPU 102 and map the page on both the CPU 102 and the PPU 202;
- (d) on the PPU 102 access to an unmapped page that is mapped on the CPU 102, that has been recently migrated, map the page to both the CPU 102 and the PPU 202;
- (e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;
- (f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;
- (g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.
- (h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and
- (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:
- (j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);
- (k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);
- (l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);
- (m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);
- (n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and
- (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2). In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 216.

Stalling and Replaying Faults

As set forth above, the UVM system 200 typically relies on the CPU 102 for remedying, at least in part, memory access faults (i.e., page faults) generated by the PPU 202. In the event of a memory access fault, a conventional PPU cancels the faulting memory transaction along with all memory transactions within the PPU that began execution subsequent to the faulting memory transaction. The SMs in such a conventional PPU do not resume issuing memory transactions until the memory access fault is resolved. By contrast, to reduce the overall performance degradation associated with a faulting memory transaction, the PPU 202 is configured to stall only the SM that issued the faulting memory transaction. While this SM is stalled, the PPU 202 executes any "in-flight" memory transactions that the SM issued prior to the faulting memory transaction. Further, the SM continues to replay the faulting memory transaction and any of the in-flight memory transactions that do not successfully complete until all of these memory transactions succeed. Advantageously, SMs that do not cause any unresolved memory access faults continue to issue memory transactions, and the PPU 202 continues to execute these memory transactions while the UVM system 200 remedies outstanding memory access faults.

In general, the techniques described herein are illustrative rather than restrictive, and may be modified to reflect various implementations without departing from the broader spirit and scope of the invention. For instance, the SM is one of many units that may issue memory transactions. Embodiments of the current invention may include any number and type of execution units instead of or in conjunction with the SM. Further, selectively stalling only particular units within the PPU and replaying memory transactions while resolving memory access faults may be implemented in any technically feasible fashion. For instance, the PPU may replay faulting memory transactions issued by certain "replayable" units and discard faulting memory transactions issued by other units.

The selective stalling and replay functionality described herein may be implemented in the PPU MMU 213, a different memory management unit, dedicated hardware units, or software that executes on programmable hardware units—in any combination. Further, the PPU 202 may be included in any type of computer system. For instance, the PPU 202 may be included in a computer system that does not implement a unified virtual memory architecture.

PPU with Replay Units

Figure 3:
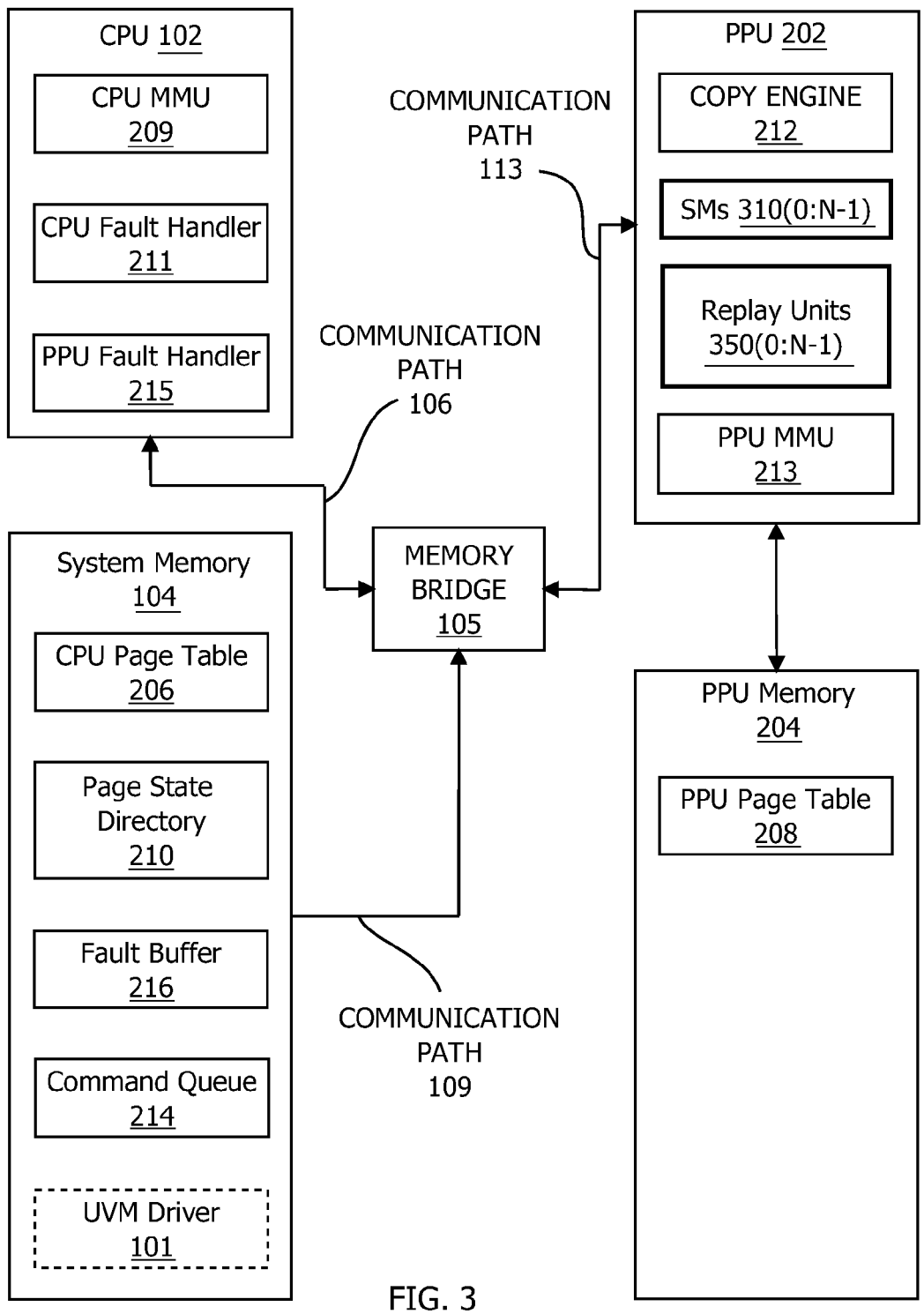
FIG. 3 is a block diagram illustrating a unified virtual memory system (UVM) configured with replay units, according to another embodiment of the present invention.

FIG. 3 is a block diagram illustrating a unified virtual memory system (UVM) 200 configured with replay units 350, according to another embodiment of the present invention. The PPU 202 includes any number N of streaming multiprocessors (SMs) 310 and N replay units 350—one replay unit 350 per SM 310. For instance, if the PPU 202 were to include thirty-two SMs 310(0:31), then the PPU 202 would include thirty-two replay units 350(0:31). Each replay unit 350 enables the PPU 202 to stall the corresponding SM 310 while replaying selected memory transactions, without delaying the other SMs 310.

Figure 4:
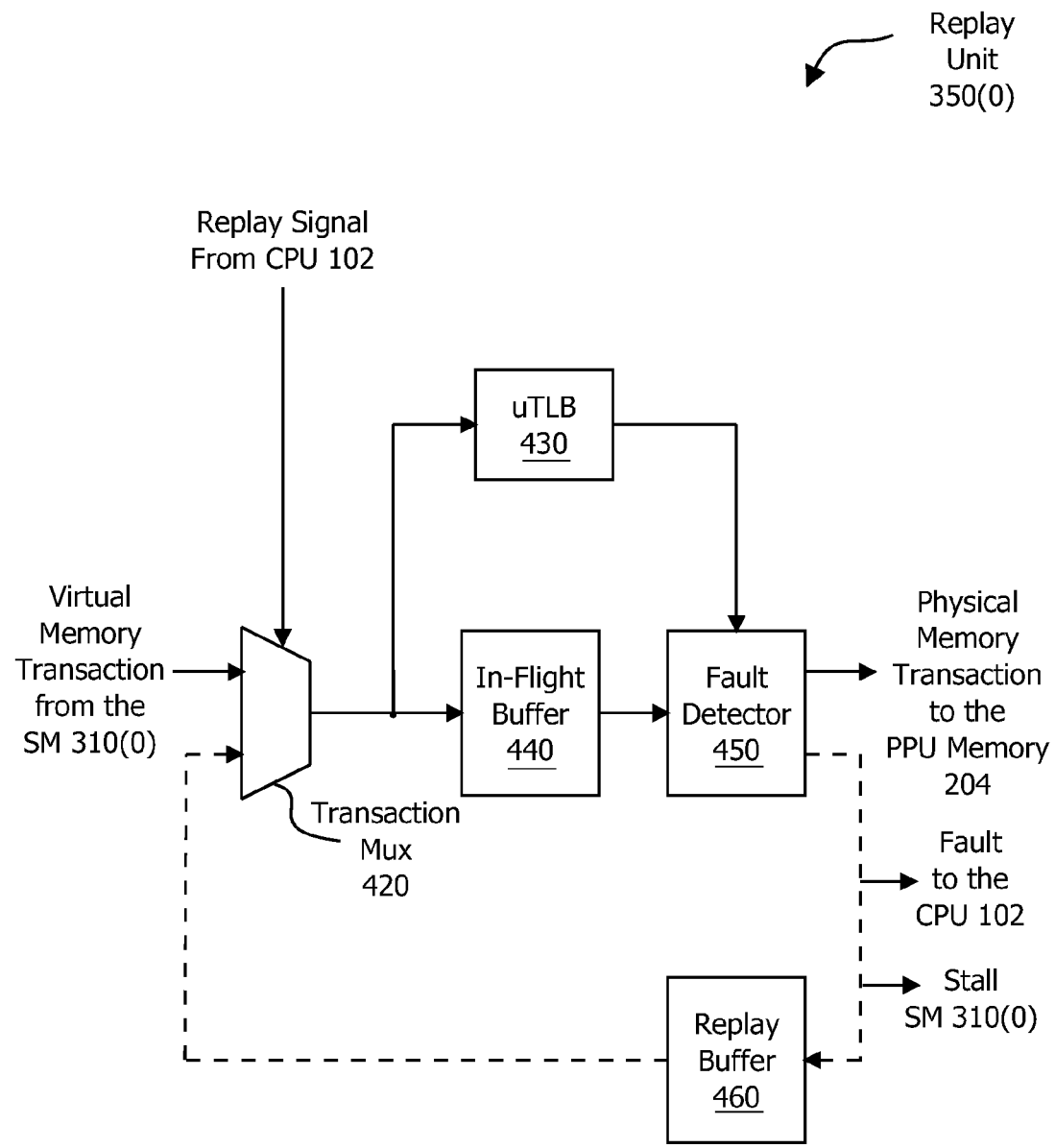
FIG. 4 is a conceptual diagram illustrating the replay unit of FIG. 3, according to one embodiment of the present invention.

FIG. 4 is a conceptual diagram illustrating the replay unit 350(0) of FIG. 3, according to one embodiment of the present invention. As shown, the replay unit 350(0) includes, without limitation, a transaction multiplexer (transaction mux) 420, a micro-translation lookaside buffer (uTLB) 430, an in-flight buffer 440, a fault detector 450, and a replay buffer 460.

In general, threads executing within the SM 310(0) each generate a stream of virtual memory transactions from the SM 310(0). After the SM 310(0) issues a particular virtual memory transaction from the SM 310(0), the virtual memory transaction from the SM 310(0) passes through the transaction mux 420 before reaching the uTLB 430 and the in-flight buffer 440.

The uTLB 430 performs one or more lookup operations to map the virtual memory address of the virtual memory transaction from the SM 310(0) to a physical memory address in the PPU memory 204. Notably, the uTLB 340 is configured to cache mappings, which are further represented by a hierarchy of TLB caches. A page table, or global TLB data structure, (not shown) is configured to store all mappings over all virtual address spaces associated with a processor complex comprising one or more PPUs 202, and one or more CPUs 102.

As persons skilled in the art will recognize, in the event of a cache-miss, the lookup operations performed by the uTLB 430 may be time-consuming. Consequently, the in-flight buffer 440 queues the virtual memory transactions from the SM 310(0) in a first-in-first-out order, thereby retaining the context of each virtual memory transaction from the SM 310(0) with respect to the lookup operations of the uTLB 430.

If the uTLB successfully processes the virtual request from the SM 310(0), then the fault detector 450 routes a corresponding physical memory transaction to the PPU memory 204. In the physical memory transaction to the PPU memory 204, the virtual address included in the virtual memory transaction from the SM 310(0) is replaced with the physical address resulting from the uTLB 430 lookup operations.

By contrast, if uTLB 430 is unable to map the virtual address specified by the virtual memory transaction from the SM 310, or if the virtual address requires a change of disposition of a target page of memory, then the uTLB 430 generates a memory access fault. The fault detector 450 processes the memory access fault—sending a fault signal to the CPU 120 and temporarily inhibiting the SM 310(0) from issuing new virtual memory transactions. Advantageously, the fault detector 450 does not cause any other SMs 310 included in the PPU 202 to cease issuing new virtual memory transactions.

As part of processing the memory access fault, the fault detector 450 causes a fault buffer entry to be written to the fault buffer 216 of FIG. 2. And the fault detector 450 performs write operations that store the faulting virtual memory transaction from the SM 310(0) in the replay buffer 460. Further, the fault detector 450 causes any virtual memory transactions from the SM 310(0) that are queued in the in-flight buffer 440 to finish executing. If any of these virtual memory transactions also fault, then the fault detector 450 performs write operations that store the additional faulting virtual memory transactions in the replay buffer 460. Optionally, but preferentially, the fault detector 450 causes fault buffer entries corresponding to the additional faulting virtual memory transactions to be written to the fault buffer 216.

The PPU fault handler 215 then performs page fault sequences designed to resolve the memory access faults. Upon resolution of one or more memory access faults, the CPU 102 sends a replay signal to the replay unit 350(0). The CPU 102 may generate the replay signal in any technically feasible fashion at any time. Preferentially, the PPU fault hander 215 included in the CPU 102 generates the replay signal, generally via the command queue 214. In this way, access fault resolution processes that have a high overhead cost may be performed together, thereby improving overall performance. Generating the replay signal via the command queue 214 also allows the replay operation to be synchronized with commands that resolve faults, which pipelines fault-resolving operations and replay operations, allowing the PPU fault hander 215 to operate in a fire-and-forget manner. In alternate embodiments, the CPU 102 or the PPU 202 may generate the replay signal in any technically feasible fashion. For example, the PPU 202 may generate the replay signal at predetermined time intervals, causing periodic replays at a fixed frequency.

Upon receiving the replay signal, the replay unit 350(0) invalidates the uTLB 430, and the transaction mux 320 routes the faulting virtual memory transactions in the replay buffer 460 to the uTLB 430. For each of these faulting virtual memory transactions, the uTLB 430 attempts to map the virtual memory address to an accessible physical memory address. If, the uTLB 430 successfully maps a virtual memory transaction included in the replay buffer 460, then the fault detector 450 routes a corresponding physical memory transaction to the PPU memory 204. However, if the uTLB 430 is unable to map a particular virtual memory transaction included in the replay buffer 460, then the fault detector 450 performs write operations that re-queues the virtual memory transaction in the replay buffer 460. Notably, as the CPU 102 successfully remedies the reason for each particular page fault, the corresponding virtual memory transaction succeeds, a physical memory transaction is generated, and the virtual memory transaction is removed from the replay buffer 460.

The replay unit 350(0) continues to re-execute the memory transactions included in the replay buffer 460 until the replay buffer 460 is empty. After the replay unit 350(0) determines that the replay buffer 460 is empty, the replay unit 350 causes the SM 310(0) to resume issuing virtual memory transactions from the SM 310(0). After the SM 310(0) resumes issuing virtual memory transactions, the transaction mux 420(0) routes the virtual memory transactions to the uTLB 430 for processing.

In alternate embodiments, the virtual memory transactions may be routed to any physical memory that is accessible to the PPU 202 instead of the PPU memory 204. For instance, virtual memory transactions may be routed to shared pages included in the system memory 104.

Figure 5:
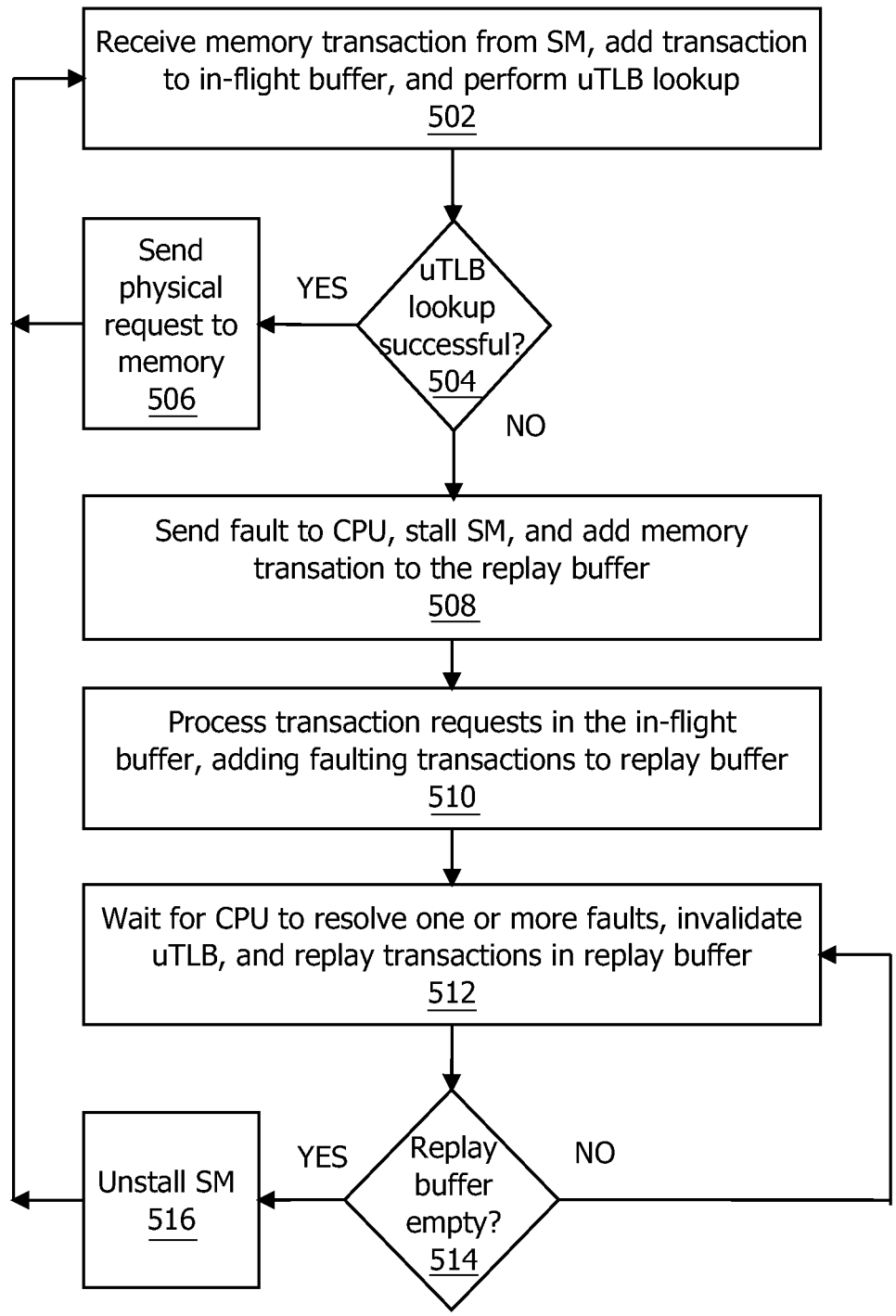
FIG. 5 is a flow diagram of method steps for managing memory transactions issued by a streaming multiprocessor (SM), according to one embodiment of the present invention.

FIG. 5 is a flow diagram of method steps for managing memory transactions issued by a streaming multiprocessor (SM), according to one embodiment of the present invention. Although the method steps are described herein in conjunction with the systems of FIGS. 1-4, persons skilled in the art will understand that any system configured to implement the method steps, in any order, falls within the scope of the present invention.

As shown, a method 500 begins at step 502, where the replay unit 350(0) receives a virtual memory transaction from an SM 310(0). In response to receiving the virtual memory transaction from the SM 310(0), the transaction mux 420 included in the replay unit 350(0) routes the virtual memory transaction to the uTLB 430, and queues the virtual memory transaction in the in-flight buffer 440. If, at step 504, if the uTLB 430 successfully processes the virtual memory transaction, then the method 500 proceeds to step 506. At step 506, the fault detector 450 included in the replay unit 350(0) routes a corresponding physical memory transaction to the PPU memory 204, and the method 500 returns to step 502. The replay unit 350(0) cycles through steps 502-506, receiving and processing virtual memory transactions from the SM 310(0), until the uTLB 430 is unable to successfully process a virtual memory transaction from the SM 310(0).

At step 504, if the uTLB 430 does not successfully map the virtual address in the virtual memory transaction to a physical address, then the method 500 proceeds to step 508. At step 508, the fault detector 450 included in the replay unit 350(0) sends a fault signal to the CPU 102, stalls the SM 310(0), and adds the faulting virtual memory transaction to the replay buffer 460. At step 510, the fault detector 450 processes any virtual memory transactions that are queued in the in-flight buffer 440. Such memory transactions correspond to memory transactions that were issued by the SM 310(0) and began executing prior to the faulting virtual memory transaction. If any of these virtual memory transactions form the SM 310(0) also fault, then the fault detector 450 performs one or more write operations that store the additional faulting virtual memory transactions in the replay buffer 460.

At step 512, the replay unit 350(0) waits for the CPU 102 to signal that one or more faults have been resolved via the replay signal. Upon receiving the replay signal, the replay unit 350(0) invalidates the uTLB 430 and re-executes the virtual memory transactions that are stored in the replay buffer 460. If, the uTLB 430 successfully maps a virtual memory transaction included in the replay buffer 460, then the replay unit 350(0) routes a corresponding physical memory transaction to the PPU memory 204. However, if the uTLB 430 is unable to map a particular virtual memory transaction included in the replay buffer 460, then the fault detector 450 performs a write operation that re-queues the virtual memory transaction in the replay buffer 460. If, at step 514, the replay unit 350(0) determines that the replay buffer 460 is not empty, then the method 500 returns to step 512. The replay unit 350(0) cycles through steps 512-514, re-executing virtual memory transactions included in the replay buffer 460, until the replay unit 350(0) determines that the replay buffer 460 is empty.

At step 514, if the replay unit 350(0) determines that the replay buffer 460 is empty, then the method 500 proceeds to step 516. At step 516, the replay unit 350(0) causes the SM 310(0) to resume issuing virtual memory transactions from the SM 310(0), and the method 500 returns to step 502. The replay unit 350(0) continues to cycle through steps 502-516, receiving and processing virtual memory transactions from the SM 510(0).

In sum, a parallel processing unit (PPU) implements fault-handling techniques that enable certain streaming multiprocessors (SMs) to continue executing threads while causing other SMs to temporarily stop executing threads. In operation, if a memory access fault attributable to a thread executing on a particular SM occurs, then a replay unit corresponding to the SM stalls the particular SM while the computer system resolves the fault. Notably, the replay unit causes the corresponding SM to cease generating additional memory transactions until the memory transaction that caused the fault is resolved. Further, the replay unit queues any in-flight memory transactions issued by the corresponding SM prior to the fault in a replay buffer. Upon resolution of the fault, the replay unit causes the memory transactions stored in the replay buffer to re-execute. After successfully executing all the memory transactions stored in the replay buffer, the replay unit enables the corresponding SM to continue generating additional memory transactions.

Advantageously, allowing un-affected SMs to continue executing while stalling an affected SM in the presence of memory access faults reduces execution penalties associated with the memory access faults. Notably, because un-affected SMs continue to execute and the faulting memory transaction is stored and replayed, instructions need not be cancelled. And, since the computer system performs fault resolution processes for in-flight faulting memory transactions together, overall system performance is improved compared to resolving each fault individually. By contrast, upon generating a memory access fault, a conventional PPU stalls all the SMs included in the PPU and cancels all the subsequent memory transactions generated by the SMs. SMs included in such a PPU do not resume issuing memory transactions until the memory access fault is resolved. Consequently, the performance degradation associated with memory access faults in PPUs that implement selective memory transaction and replay techniques is reduced compared to conventional PPUs.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for processing virtual memory transactions associated with a multithreaded processing unit, the method comprising:
    receiving a first virtual memory transaction from a first unit;
    attempting to execute the first virtual memory transaction;
    detecting a first page fault related to the first virtual memory transaction;
    storing the first virtual memory transaction in a replay buffer;
    causing a stall condition that inhibits the first unit from generating subsequent virtual memory transactions until the first page fault has been resolved; and
    once the first page fault has been resolved, re-executing the first virtual memory transaction as well as at least one other virtual memory transaction stored in the replay buffer.

2. The method of claim 1, further comprising determining that the replay buffer is empty and enabling the first unit to generate subsequent virtual memory transactions.

3. The method of claim 1, further comprising receiving a second virtual memory transaction from a second unit while the first page fault is unresolved, and successfully executing the second virtual memory transaction.

4. The method of claim 1, further comprising:
    receiving a second virtual memory transaction from the first unit prior to detecting the first page fault;
    detecting a second page fault related to the second virtual memory transaction; and
    storing the second virtual memory transaction in the replay buffer.

5. The method of claim 1, further comprising invalidating a translation lookaside buffer prior to re-executing the first virtual memory transaction.

6. The method of claim 1, wherein re-executing the first virtual memory transaction comprises:
    determining whether there is an entry in a translation lookaside buffer corresponding to the first virtual memory transaction; and
    if the entry exists, then completing the first virtual memory translation, or
    if the entry does not exist, then re-storing the first virtual memory transaction in the replay buffer.

7. The method of claim 1, wherein resolving the first page fault comprises:
    locating a memory page related to the first virtual memory transaction within a first memory subsystem based on a global translation table; and
    adding a virtual mapping for the memory page to a translation lookaside buffer.

8. The method of claim 7, wherein resolving the first page fault further comprises copying the memory page from the first memory subsystem to a second memory subsystem.

9. The method of claim 8, wherein the first memory subsystem comprises memory coupled to a central processing unit, and the second memory subsystem comprises memory coupled to the multithreaded processing unit.

10. A non-transitory computer-readable storage medium including instructions that, when executed by a multithreaded processing unit, cause the multithreaded processing unit to process virtual memory transactions by performing the steps of:
    receiving a first virtual memory transaction from a first unit;
    attempting to execute the first virtual memory transaction;
    detecting a first page fault related to the first virtual memory transaction;
    storing the first virtual memory transaction in a replay buffer;
    causing a stall condition that inhibits the first unit from generating subsequent virtual memory transactions until the first page fault has been resolved; and
    once the first page fault has been resolved, re-executing the first virtual memory transaction as well as at least one other virtual memory transaction stored in the replay buffer.

11. The non-transitory computer-readable storage medium of claim 10, further comprising determining that the replay buffer is empty and enabling the first unit to generate subsequent virtual memory transactions.

12. The non-transitory computer-readable storage medium of claim 10, further comprising receiving a second virtual memory transaction from a second unit while the first page fault is unresolved, and successfully executing the second virtual memory transaction.

13. The non-transitory computer-readable storage medium of claim 10, further comprising:
    receiving a second virtual memory transaction from the first unit prior to detecting the first page fault;
    detecting a second page fault related to the second virtual memory transaction; and
    storing the second virtual memory transaction in the replay buffer.

14. The non-transitory computer-readable storage medium of claim 10, further comprising invalidating a translation lookaside buffer prior to re-executing the first virtual memory transaction.

15. The non-transitory computer-readable storage medium of claim 10, wherein re-executing the first virtual memory transaction comprises:
    determining whether there is an entry in a translation lookaside buffer corresponding to the first virtual memory transaction; and
    if the entry exists, then completing the first virtual memory translation, or
    if the entry does not exist, then re-storing the first virtual memory transaction in the replay buffer.

16. The non-transitory computer-readable storage medium of claim 10, wherein resolving the first page fault comprises:
    locating a memory page related to the first virtual memory transaction within a first memory subsystem based on a global translation table; and
    adding a virtual mapping for the memory page to a translation lookaside buffer.

17. The non-transitory computer-readable storage medium of claim 16, wherein resolving the first page fault further comprises copying the memory page from the first memory subsystem to a second memory subsystem.

18. The non-transitory computer-readable storage medium of claim 17, wherein the first memory subsystem comprises memory coupled to a central processing unit, and the second memory subsystem comprises memory coupled to the multithreaded processing unit.

19. A system configured to process virtual memory transactions, the system comprising:
    a memory; and
    a multithreaded processing unit coupled to the memory and configured to:
        receive a first virtual memory transaction from a first unit;
        attempt to execute the first virtual memory transaction on the memory;
        detect a first page fault related to the first virtual memory transaction;
        store the first virtual memory transaction in a replay buffer;
        cause a stall condition that inhibits the first unit from generating subsequent virtual memory transactions until the first page fault has been resolved; and
        once the first page fault has been resolved, re-execute the first virtual memory transaction as well as at least one other virtual memory transaction stored in the replay buffer.

20. The system of claim 19, wherein the multithreaded processing unit is further configured to receive a second virtual memory transaction from a second unit while the first page fault is unresolved, and successfully execute the second virtual memory transaction.

* * * * *